United States Patent
Hanson et al.

(10) Patent No.: US 7,124,630 B2
(45) Date of Patent: Oct. 24, 2006

(54) MULTIPURPOSE SENSOR FOR AIRCRAFT

(75) Inventors: Nicolas Hanson, Danze (FR); Marc Simeon, Vendome (FR); Jean-Jacques Barbou, La Ferte Beauharnais (FR)

(73) Assignee: Thales, Neuilly sur Seine (FR)

( * ) Notice: Subject to any disclaimer, the term of this patent is extended or adjusted under 35 U.S.C. 154(b) by 129 days.

(21) Appl. No.: 10/493,567

(22) PCT Filed: Dec. 10, 2002

(86) PCT No.: PCT/FR02/04261

§ 371 (c)(1),
(2), (4) Date: Apr. 26, 2004

(87) PCT Pub. No.: WO03/050496

PCT Pub. Date: Jun. 19, 2003

(65) Prior Publication Data
US 2004/0237641 A1    Dec. 2, 2004

(30) Foreign Application Priority Data
Dec. 11, 2001    (FR) .................................. 01 15991

(51) Int. Cl.
    *G01P 13/00*    (2006.01)
(52) U.S. Cl. .................. 73/170.02; 73/170.01
(58) Field of Classification Search ............ 73/170.02, 73/180, 182, 170.01
See application file for complete search history.

(56) References Cited

U.S. PATENT DOCUMENTS

| 2,370,102 | A | * | 2/1945 | Woodman ................. 73/861.68 |
| 2,404,978 | A | | 7/1946 | Morton |
| 2,984,107 | A | | 5/1961 | Mohring et al. |
| 4,437,343 | A | * | 3/1984 | Dixon et al. ................... 73/182 |
| 5,025,661 | A | | 6/1991 | Mccormack |
| 5,616,861 | A | * | 4/1997 | Hagen ......................... 73/180 |
| 6,070,475 | A | * | 6/2000 | Muehlhauser et al. ... 73/861.68 |
| 6,076,963 | A | * | 6/2000 | Menzies et al. ............ 374/138 |
| 6,101,429 | A | * | 8/2000 | Sarma et al. ................... 701/7 |
| 6,490,510 | B1 | * | 12/2002 | Choisnet ....................... 701/14 |
| 6,568,260 | B1 | * | 5/2003 | Hakenesch ................ 73/178 R |
| 6,817,240 | B1 | * | 11/2004 | Collot et al. ............. 73/170.02 |
| 2003/0051546 | A1 | * | 3/2003 | Collot et al. ............. 73/170.02 |

FOREIGN PATENT DOCUMENTS

| FR | 2817044 | 11/2000 |
| FR | 2 802 647 | 6/2001 |

* cited by examiner

*Primary Examiner*—Edward Lefkowitz
*Assistant Examiner*—Andre Allen
(74) *Attorney, Agent, or Firm*—Lowe Hauptman & Berner LLP

(57) ABSTRACT

The invention concerns a multifunction probe for aircraft. The probe measures the total pressure and measures the total temperature of an air flow surrounding the aircraft. The total pressure is measured by a first tube, the so-called Pitot tube oriented substantially along the axis of the air flow surrounding the aircraft, the total temperature is measured by a second tube open to the air flow and oriented substantially in the axis of the air flow. The first tube is situated inside the second tube. The invention also concerns a process for shaping a heating wire forming means of deicing of the multifunction probe. The process includes: winding the heating wire helically around a first mandrel, inserting the first mandrel into a second hollow mandrel, continuing the winding of the heating wire around the second mandrel, and placing the heating wire, thus formed, inside the two tubes and being fixed therein.

22 Claims, 4 Drawing Sheets

MULTIPURPOSE SENSOR FOR AIRCRAFT

BACKGROUND OF THE INVENTION

The invention concerns a multifunction probe for aircraft, which probe makes it possible in particular to measure the total pressure Pt and the total temperature Tt of an air flow surrounding the aircraft.

The measurement of these two parameters, total temperature and total pressure, helps to determine the actual velocity of the aircraft. Advantageously, the multifunction probe furthermore comprises means for measuring the static pressure Ps and the angle of incidence α of the air flow surrounding the aircraft. All the parameters necessary for determining the modulus and the direction of the velocity vector of the aircraft are thus available.

French patent application FR 2 802 647 filed on Dec. 17, 1999 in the name of THOMSON-CSF describes such a probe comprising a Pitot tube for measuring the total pressure Pt of the air flow and means for measuring the total temperature Tt in the form of a first channel whose air inlet orifice substantially faces the flow and of a second channel comprising a temperature sensor. The second channel bleeds off part of the air circulating in the first channel. In the embodiment described in French patent application FR 2 802 647, the Pitot tube and the first channel belonging to the means for measuring the total temperature Tt are substantially parallel and disposed in the vicinity of one another.

In practice, the first channel is advantageously disposed above or below the Pitot tube but not on one of its sides. This disposition makes it possible for the means for measuring total pressure Pt and the means for measuring total temperature Tt not to mutually disturb one another when the angle of incidence of the air flow, situated in the vicinity of the probe, is modified. On the other hand, this disposition tends to increase the projection of the probe with respect to the skin of the aircraft. Specifically, it is necessary for the air inlet orifices of the Pitot tube and of the first channel both to be situated outside a boundary layer situated in the immediate vicinity of the skin of the aircraft and in which the air is unsuitable for a good measurement of temperature or pressure.

The increase in the projection gives rise to greater fragility of the probe that would have to be alleviated by increasing the dimensions of the mast or of the airfoil carrying the Pitot tube and the first channel. The invention makes it possible to avoid this defect by reducing the projection of the probe.

Moreover, the probes mounted on aircraft are subjected to considerable temperature variations and, sometimes, to conditions under which ice may develop, in particular inside the Pitot tube or the channels allowing the measurement of total temperature Tt. The ice disturbs the measurements and, to avoid it, the probe comprises means for warming itself. These means comprise, in general, a wire warming the probe through the joule effect. This wire is coiled in the walls of the Pitot tube and in that of the channels allowing the measurement of total temperature. To produce the heating wire, use is commonly made of an electrical conductor comprising an iron and nickel alloy shrouded in a mineral insulant such as alumina or magnesia. The insulant is itself shrouded in a nickel or inconel sheath allowing the wire to be brazed to the body of the probe. Before the brazing operation, the heating wire is formed for example by winding it around cylindrical mandrels comprising reference marks making it possible to position the heating wire on the mandrels. When producing the form of the heating wire for a probe such as described in French patent application FR 2 802 647, it is impossible to wind a heating wire on two parallel mandrels. One of the mandrels then has to be offset from the axis in order to perform the operation of shaping the heating wire. Subsequently, the two mandrels are brought back parallel to one another to give the heating wire its definitive form. The latter operation of moving the mandrels is traumatic for the heating wire since it gives rise to torsional stresses in the heating wire. There is a risk that these stresses may fracture the sheath of the heating wire and consequently may reduce its reliability.

To alleviate this problem, it is possible to use two separate heating wires, one to warm the Pitot tube and the other to warm the first channel of the means for measuring total temperature. This solution is not desirable since it multiplies up the electrical connections of the probe with the aircraft on which it is mounted.

The invention makes it possible to produce a probe measuring the total pressure Pt and the total temperature Tt, which probe is equipped with a single heating wire. The inter-disposition of the various elements of the probe makes it possible to avoid any abnormal torsion of the heating wire.

SUMMARY OF THE INVENTION

The subject of the invention is a multifunction probe for aircraft, comprising means for measuring the total pressure and means for measuring the total temperature of an air flow surrounding the aircraft, the means for measuring the total pressure comprising a first tube the so-called Pitot tube oriented substantially along the axis of the air flow surrounding the aircraft, the means for measuring the total temperature comprising a second tube open to the air flow and oriented substantially in the axis of the air flow, characterized in that the first tube is situated inside the second tube.

The subject of the invention is also a process for shaping a heating wire forming means of deicing the multifunction probe. The process consists in:

winding the heating wire helically around a first mandrel,
 inserting the first mandrel into a second hollow mandrel,
 continuing the winding of the heating wire around the second mandrel
 placing the heating wire, thus formed, inside the two tubes and being fixed therein.

The probe described in French patent application FR 2 802 647 comprises a moving vane that orients itself in the axis of the air flow which surrounds it. It is of course understood that the invention may be implemented equally well in respect of a probe comprising a moving vane as in respect of a probe not comprising one. This type of probe is known by the name fixed probe and the pressure taps, Pitot tube and first channel, have a fixed position with respect to the skin of the aircraft.

The invention will be better understood and other advantages will become apparent on reading the detailed description of an embodiment given by way of example, which description is illustrated by the appended drawing in which:

BRIEF DESCRIPTION OF THE DRAWINGS

FIG. 4 represents a first mandrel in perspective, around which mandrel the heating wire is wound and FIG. 5 represents two mandrels in perspective.

Figure 1:
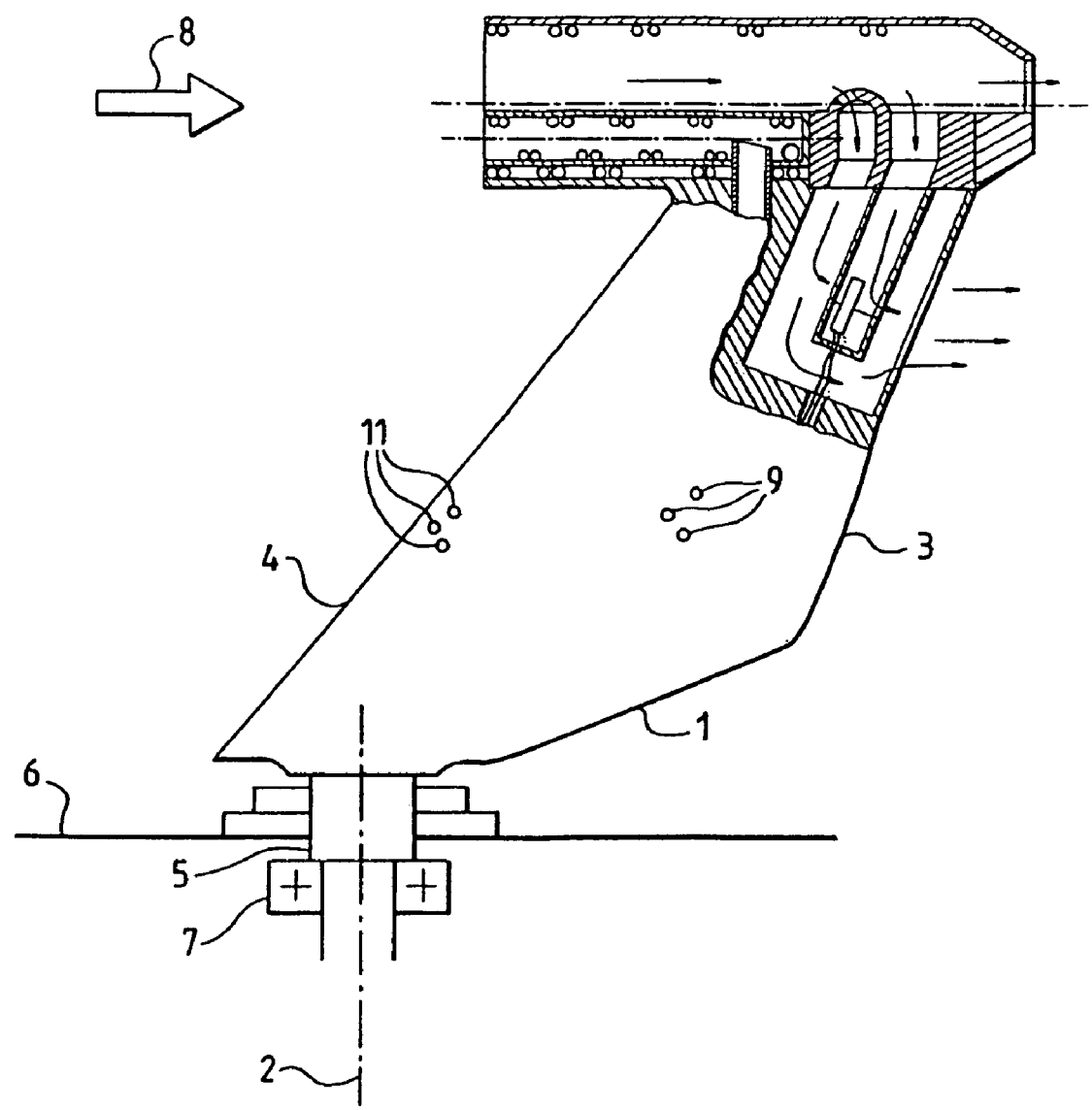
FIG. 1 represents a probe comprising means for measuring the total temperature of the air flow, means for measuring the total pressure of the air flow, means for measuring the static pressure of the air flow, means for measuring the angle of incidence of the air flow surrounding the aircraft, the plane of the figure containing the axis of the flow.

The probe represented in FIG. 1 comprises a moving vane 1 rotatable about an axis 2. The vane 1 comprises an airfoil 3 possessing a plane of symmetry, parallel to the plane of the figure and separating the pressure surface from the suction surface. The profile of the airfoil 3 perpendicular to its leading edge 4 is for example of the N.A.C.A. OOZT type. In the example represented, the leading edge 4 is substantially straight and inclined with respect to the axis 2. Other airfoil shapes can of course be used to implement the invention. The vane 1 also comprises a shaft 5 of axis 2 which enters inside the skin 6 of an aircraft. The shaft 5 is movable in rotation with respect to the aircraft, for example, by means of a roller bearing 7.

DETAILED DESCRIPTION OF THE PREFERED EMBODIMENT

Owing to the shape of the airfoil 3, the vane 1 orients itself naturally along the axis of the air flow surrounding the moving vane 1. The axis of the flow is demarcated by the arrow 8 represented in FIG. 1.

The moving vane 1 furthermore comprises means for measuring the total temperature of the air flow and means for measuring the total pressure of the air, which means are carried by the moving vane 1. These means will be better described with the aid of FIG. 2.

Advantageously, the probe furthermore comprises means for measuring the static pressure Ps and the angle of incidence of the air flow.

The means for measuring the static pressure Ps comprise for example two static pressure taps 9 and 10, each situated on one of the faces of the moving vane 1. In FIG. 1 only the pressure tap 9 is visible. The pressure tap 10 is placed on the invisible face of the moving vane 1, in a manner substantially symmetric with the pressure tap 9 with respect to the plane of symmetry of the airfoil 3. This plane of symmetry is parallel to the plane of FIG. 1. Each pressure tap 9 and 10 can comprise several orifices, three are represented in FIG. 1, in order in particular to limit the cross section of each orifice so as to cause less disturbance to the air flow surrounding the moving vane 1 or else to be able to carry out the pressure measurement even if one of the orifices were to be obstructed. The two static pressure taps 9 and 10 are in communication with a chamber situated inside the vane in order to average the pressure between the two taps 9 and 10.

The means for measuring the angle of incidence of the flow comprise for example two incidence pressure taps 11 and 12 situated, like the static pressure taps 9 and 10, on one of the faces of the vane likewise in a substantially symmetric manner with respect to the plane of symmetry of the airfoil 3. The incidence pressure taps 11 and 12 are not in communication and it is the difference between the pressures prevailing at the level of each tap 11 and 12 that makes it possible to determine the exact angle of incidence of the moving vane 1 and consequently that of the aircraft. In order to improve the sensitivity of the angle of incidence measurement, the pressure taps 11 and 12 can be placed in the immediate vicinity of the leading edge 4 of the moving vane 1.

The use of the information emanating from the various taps for total and static pressure and angle of incidence, is for example described in French patent application FR 2 665 539 filed on Aug. 3, 1990 in the name of Sextant Avionique.

This patent describes in particular the slaving of the angular position of the moving vane 1 about its axis 2 so that the airfoil 3 of the moving vane 1 is best aligned along the axis 8 of the air flow.

The orientation, thus improved, of the moving vane 1 makes it possible in particular to improve the alignment of the total pressure Pt and total temperature Tt tap means with the axis 8 of the air flow.

Figure 2:
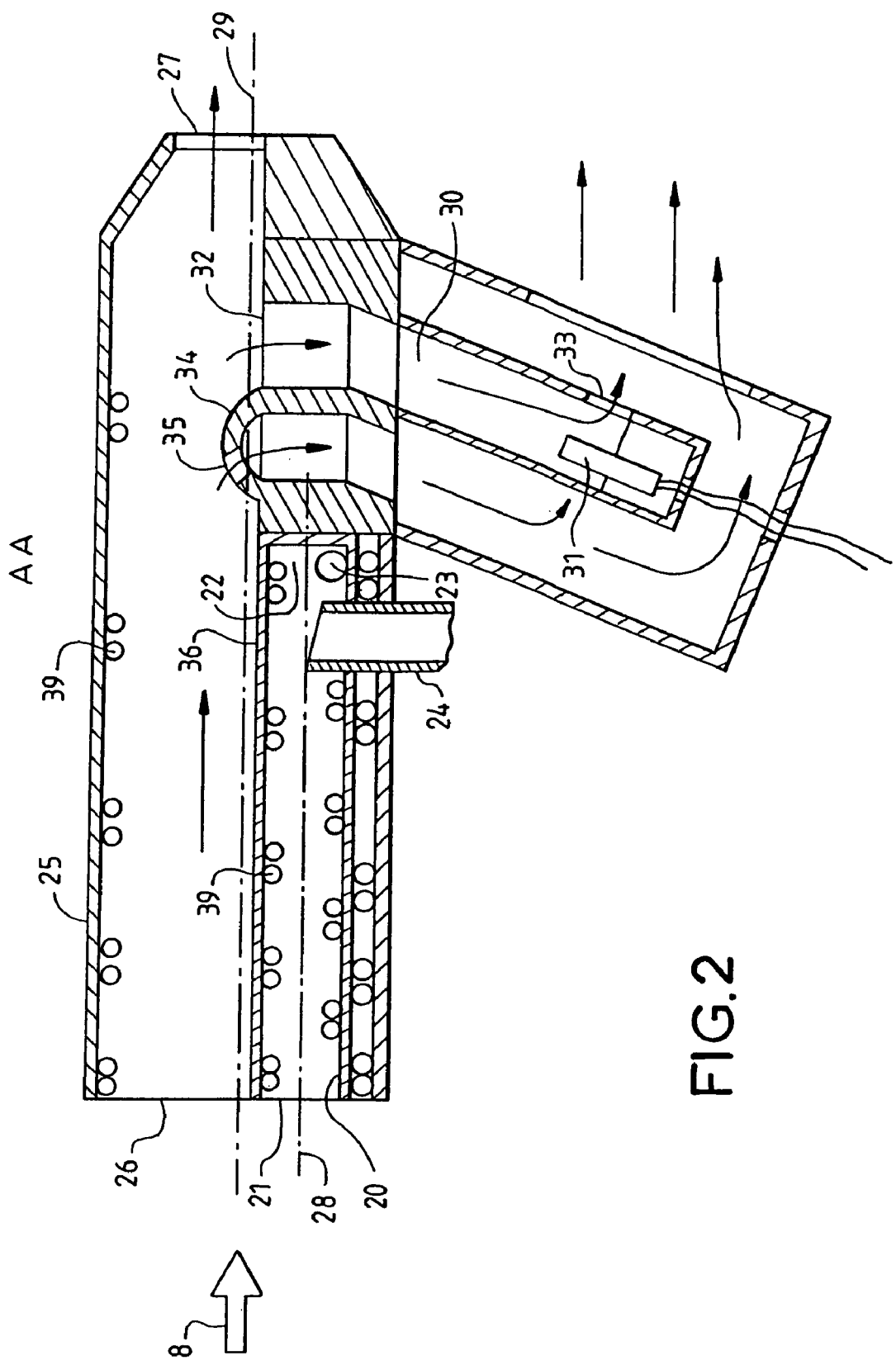
FIG. 2 represents a magnified partial view of the means for measuring the total pressure and the total temperature of the flow, in which view the sectional plane is the same as that of FIG. 1.

FIG. 2 represents the part of the probe furthest from the skin 6 of the aircraft. The means for measuring the total pressure comprise a first tube 20, advantageously of circular cross section, the so-called Pitot tube oriented substantially along the axis 8 of the air flow. More precisely, the tube 20 comprises an air inlet orifice 21 substantially facing the air flow of axis 8. At the end 22 of the tube 20, the opposite end 22 from the orifice 21, the tube 20 comprises a purge hole 23 making it possible to discharge particles liable to enter the tube 20. Still at the level of the end 22 of the tube, a channel 24 opens into the tube 20. The channel 24 is for example connected to a pressure sensor (not represented in the figure). The pressure sensor allows effective measurement of the total pressure Pt of the air flow.

The means for measuring the total temperature Tt comprise a second tube 25, advantageously of circular cross section, and open onto the air flow at the level of an inlet orifice 26. The second tube 25 also comprises an outlet orifice 27 allowing air located in the second tube 25 to escape along the direction of the axis 8. The cross section of the inlet orifice 26 is substantially that of the tube 25 and the cross section of the outlet orifice 27 is smaller than that of the inlet orifice 26. The outlet orifice 27 allows particles circulating in the tube 25 to be discharged without coming into contact with a temperature sensor whose position will be described later. These particles are, for example, formed of drops of water or of dust.

In accordance with the invention, the Pitot tube 20 is situated inside the second tube 25. Advantageously, the Pitot tube 20 extends along an axis 28 and the second tube 25 extends along an axis 29. The axis 28 and the axis 29 are substantially parallel. The inlet orifices 21 and 26 of the two tubes 20 and 25 are substantially coplanar. Thus, a part of the air flow entering one of the tubes 20 or 25 does not disturb another part of the air flow entering the other tube.

The means for measuring the total temperature Tt furthermore comprise a channel 30 in which there circulates a part of the air circulating in the second tube 25, as well as a temperature sensor 31 fixed in the channel 30. The channel 30 comprises an air inlet 32 situated in the second tube 25. A part of the air circulating in the second tube 25 enters the channel 30 through the air inlet 32 and escapes from the channel 30 through an air outlet 33 opening to the outside downstream of the probe.

Before entering the channel 30, the air circulating in the second tube 25 passes above a deflector 34 comprising an orifice 35 allowing air belonging to a boundary layer that develops along the wall of the Pitot tube 20 inside the second channel 25 to be discharged out of the probe.

Figure 3:
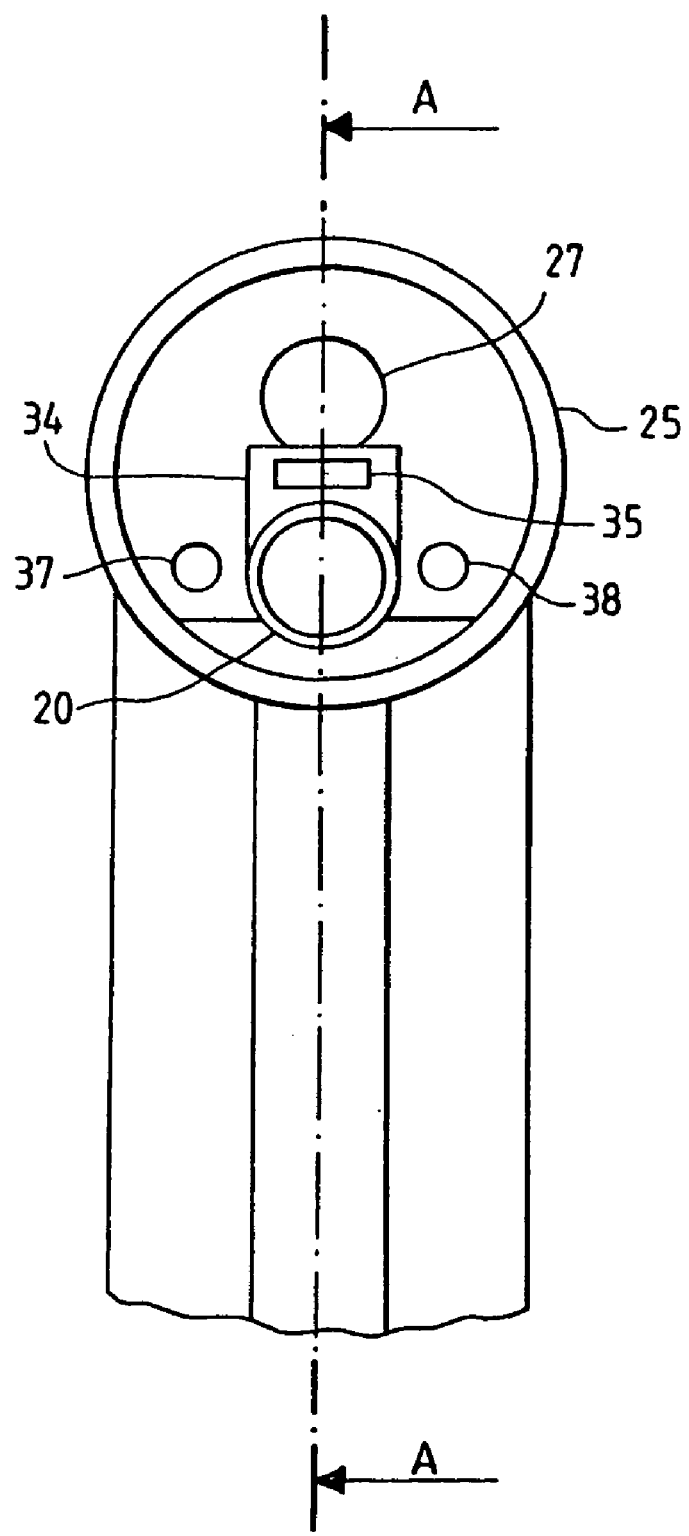
FIG. 3 represents the air inlet of the means for measuring the total pressure and the total temperature, which view is in a plane perpendicular to the plane of FIG. 1.

Advantageously, the air inlet 32 is situated in the vicinity of an upper wall 36 of the Pitot tube 20. More precisely, the air inlet 32 is situated in direct extension to the upper wall 36. This location of the air inlet 32 makes it possible for air circulating in the second tube 25 and disturbed by the internal walls of the tube 25 to be prevented from entering the channel 30. The disturbed air forms a boundary layer along the internal walls of the tube 25, which boundary layer need not be discharged out of the second tube 25 upstream of the air inlet 32. This boundary layer is nevertheless discharged from the second tube 25 in particular through the outlet orifice 27 situated at the downstream end of the second tube 25. Other outlet orifices, for example two in number, and bearing the reference marks 37 and 38 allow the discharge of the boundary layer developed inside the second tube 25. The orifices 37 and 38 are visible in FIG. 3 and are situated on either side of the Pitot tube 20. The fact that the air inlet 32 is situated in the vicinity of the upper wall 36 of the Pitot tube 20 makes it possible moreover for liquids entering the second tube 25 to be prevented from entering the air inlet 32. Specifically, such liquids are preferably localized by gravity on the inside walls of the second tube 25 without reaching the air inlet 32. Specifically, the position of the air inlet 32 in the vicinity of an upper wall 36 of the Pitot tube 20 is far from the inside walls of the second tube 25 and is close to the center of the second tube 25.

Advantageously, the probe comprises deicing means making it possible to warm the probe. These means are necessary in particular when the aircraft which carries the probe is flying at high altitude where conditions prevail in which there is a risk of ice forming on the walls of the probe. The warming means comprise a heating wire 39 which, by virtue of the relative position of the Pitot tube 20 and of the second tube 25 can be a single wire for warming the Pitot tube 20 and the second tube 25. The heating wire 39 is wound helically both inside the Pitot tube 20 and inside the second tube 25. The heating wire 39 is fixed against the inside walls of the tubes 20 and 25 for example by brazing. It is not necessary to embed the heating wire 39 in the inside walls of the tubes 20 and 25, since it is at less risk of being subjected to possible mechanical attack than if it was situated outside the tubes 20 and 25. Embedding the heating wire 39 in the inside walls of the tubes 20 and 25 would involve making grooves in the walls of the tubes 20 and 25. The invention makes it possible to avoid these grooves. Furthermore, the fact that the air inlet 32 is situated in the vicinity of the upper wall 36 of the Pitot tube 20 makes it possible moreover for the air currents entering the air inlet 32 to be prevented from being disturbed, and in particular warmed, by the heating wire 39.

The position of the heating wire 39 inside the tubes 20 and 25 makes it possible to deice the inside of the tubes 20 and 25 directly. This makes it possible to reduce the power necessary for deicing. Specifically, when the heating wire 39 is positioned outside the tubes 20 and 25, it is necessary for the heat to be conducted by the walls of the tubes 20 and 25 in order to deice the inside of the tubes 20 and 25.

Figure 4:
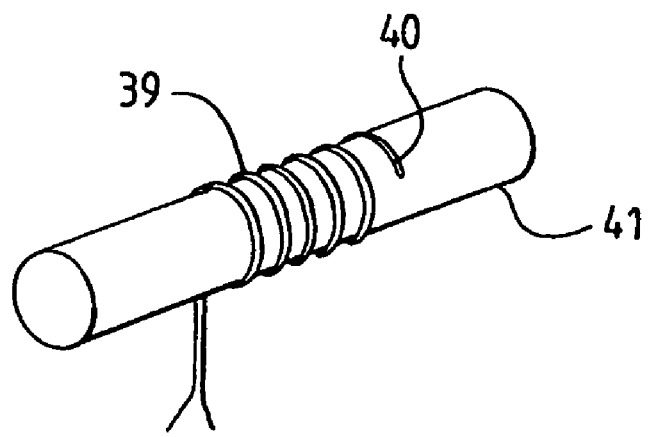
FIGS. 4 and 5 represent the tooling for coiling a heating wire used for warming the probe; more precisely.
Figure 5:
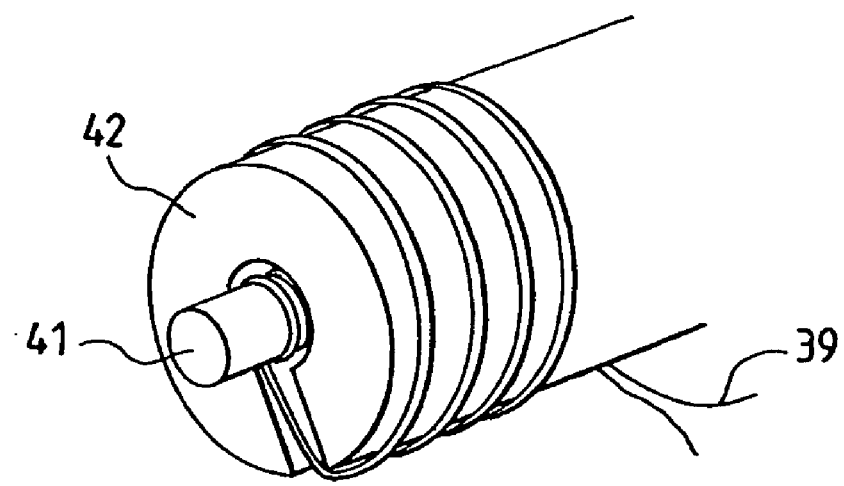

The heating wire 39 is formed before being fixed on the probe. An exemplary process for shaping the heating wire 39 is described with the aid of FIGS. 4 and 5. The heating wire 39 is firstly paid out to a length sufficient to ensure the warming of the probe, then bent in two in such a way that its two ends are in the vicinity of one another. Onwards of the bend 40 thus produced, the heating wire 39 is wound helically around a first cylindrical mandrel 41 whose diameter is less than the inside diameter of the Pitot tube 20 in such a way that the thus helically wound wire can be inserted inside the Pitot tube 20. The winding of the wire 39 around the first mandrel 40 is represented in FIG. 4. Once a number of sufficient turns has been made around the first mandrel 40, this mandrel 41 is inserted inside a second hollow mandrel 42; the helical winding of the heating wire 39 around the second mandrel 42 is then continued. This second phase of the winding of the heating wire 39 is visible in FIG. 5. The heating wire 39 having a certain elasticity, once the winding has been produced around the two mandrels 41 and 42, it can slide along the two mandrels 41 and 42 so as to disengage therefrom. Thereafter, the heating wire 39 thus formed can be placed inside the two tubes 20 and 25 so as to be fixed therein. As described previously, the heating wire 39 can comprise a nickel or inconel outer sheath. This material allows the brazing of the sheath inside the tubes 20 and 25 by heating of the probe inside which the heating wire 39 has been placed, the temperature and the time of heating of the probe have to be sufficient to carry out the brazing of the heating wire 39.

Only the shape of the heating wire 39 inside the two tubes 20 and 25 has been described hereinabove. It is of course understood that the same heating wire 39 can be extended so as to warm other parts of the probe in particular the moving vane 1.

The invention claimed is:

1. A multifunction probe for aircraft, comprising:
   means for measuring the total pressure; and
   means for measuring the total temperature of an air flow surrounding the aircraft, the means for measuring the total pressure comprising a first tube oriented substantially along the axis of the air flow surrounding the aircraft, and the means for measuring the total temperature comprise a second tube open to the air flow and oriented substantially in the axis of the air flow, wherein the first tube is situated inside the second tube.

2. The multifunction probe as claimed in claim 1, wherein the first tube extends along a first axis, wherein the second tube extends along a second axis, and wherein the first axis and the second axis are substantially parallel.

3. The multifunction probe as claimed in claim 1, wherein the first and the second tube have a substantially circular cross section.

4. The multifunction probe as claimed in claim 1, wherein the first tube opens onto the air flow through a first air inlet orifice, wherein the second tube opens onto the flow through a second air inlet orifice, and wherein the two orifices are substantially coplanar.

5. The multifunction probe as claimed in claim 1, wherein the means for measuring the total temperature comprise a channel in which there circulates part of the air circulating in the second tube and a temperature sensor fixed in the channel and wherein the channel comprises an air inlet situated in the second tube.

6. The multifunction probe as claimed in claim 5, wherein the air inlet is situated in the vicinity of an upper wall of the first tube.

7. The multifunction probe as claimed in claim 1, wherein the multifunction probe comprises deicing means, comprising a single heating wire for warming the first tube and the second tube.

8. The multifunction probe as claimed in claim 7, wherein the heating wire is fixed against the inside walls of each tube.

9. The multifunction probe as claimed in claim 8, wherein the heating wire is brazed onto the inside face of each tube.

10. The multifunction probe as claimed in claim 1, wherein the multifunction probe comprises a moving vane intended to orient itself in the axis of the air flow, and in that the total pressure tap means and the total temperature measurement means are carried by the moving vane.

11. The multifunction probe as claimed in claim 1, wherein said first tube is a Pitot tube.

12. A multifunction probe for aircraft, comprising:
a channel in which there circulates air;
a temperature sensor positioned in said channel;
a first tube oriented substantially along an axis of an flow surrounding the aircraft;
a second tube open to the air flow; wherein said first tube is situated inside the second tube.

13. The multifunction probe as claimed in claim 12, wherein said first tube is a Pitot tube.

14. The multifunction probe as claimed in claim 12, wherein the first tube extends along a first axis, wherein the second tube extends along a second axis, and wherein the first axis and the second axis are substantially parallel.

15. The multifunction probe as claimed in claim 12, wherein the first and the second tube have a substantially circular cross section.

16. The multifunction probe as claimed in claim 12, wherein the first tube opens onto the air flow through a first air inlet orifice, wherein the second tube opens onto the flow through a second air inlet orifice, and wherein the two orifices are substantially coplanar.

17. The multifunction probe as claimed in claim 12, wherein the channel comprises an air inlet situated in the second tube.

18. The multifunction probe as claimed in claim 17, wherein the air inlet is situated in the vicinity of an upper wall of the first tube.

19. The multifunction probe as claimed in claim 12, wherein the multifunction probe comprises deicing means, comprising a single heating wire for warming the first tube and the second tube.

20. The multifunction probe as claimed in claim 19, wherein the heating wire is fixed against the inside walls of each tube.

21. The multifunction probe as claimed in claim 19, wherein the heating wire is brazed onto the inside face of each tube.

22. The multifunction probe as claimed in claim 12, wherein the multifunction probe comprises a moving vane intended to orient itself in the axis of the air flow, and in that the total pressure tap means and the total temperature measurement means are carried by the moving vane.

* * * * *